(12) United States Patent
Wakasugi

(10) Patent No.: US 10,752,057 B2
(45) Date of Patent: Aug. 25, 2020

(54) PNEUMATIC TIRE

(71) Applicant: Sumitomo Rubber Industries, Ltd., Kobe-shi, Hyogo (JP)

(72) Inventor: Masashi Wakasugi, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 292 days.

(21) Appl. No.: 15/683,938

(22) Filed: Aug. 23, 2017

(65) Prior Publication Data

US 2018/0072105 A1   Mar. 15, 2018

(30) Foreign Application Priority Data

Sep. 14, 2016   (JP) .................................. 2016-179798

(51) Int. Cl.
*B60C 11/12* (2006.01)
*B60C 11/03* (2006.01)

(52) U.S. Cl.
CPC ...... *B60C 11/1236* (2013.01); *B60C 11/0304* (2013.01); *B60C 11/1204* (2013.01); *B60C 11/1218* (2013.01); *B60C 11/1281* (2013.01)

(58) Field of Classification Search
CPC ............. B60C 11/0304; B60C 11/1236; B60C 11/0306; B60C 11/12; B60C 11/1204; B60C 11/0302
See application file for complete search history.

(56) References Cited

U.S. PATENT DOCUMENTS 9,783,005 B2* 10/2017 Kujime ............... B60C 11/0304
2010/0263775 A1* 10/2010 Watanabe ............... B60C 11/12
152/209.8

(Continued)

FOREIGN PATENT DOCUMENTS

EP        2918427 A2    9/2015
JP     2003-159911 A    6/2003

(Continued)

OTHER PUBLICATIONS

Machine translation of JP 2014205459 A as provided by https://www.j-platpat.inpit.go.jp/s0100 (Year: 2014).*

(Continued)

*Primary Examiner* — Alison L Hindenlang
*Assistant Examiner* — Debjani Roy
(74) *Attorney, Agent, or Firm* — Birch, Stewart, Kolasch & Birch, LLP

(57) ABSTRACT

A pneumatic tire 1 comprises a tread portion 2 having an outboard tread edge Te1 to be positioned away from the center of a vehicle body and an inboard tread edge Te2 to be positioned close to the center of the vehicle body. The tread portion 2 is provided with an inboard shoulder main groove 12, and an inboard shoulder land region 15 between the inboard shoulder main groove 12 and the inboard tread edge Te2. The inboard shoulder land region 15 is provided with inboard shoulder rug grooves 21, connecting sipes 22, and inboard shoulder sipes 23. The inboard shoulder sipe 23 is made up of a straight outer part 24 extending from the inboard tread edge Te2 toward the axially inside, and a straight inner part 25 extending to the inboard shoulder main groove 12 at a flexion angle with respect to the outer part 24. The axial length of the inner part 25 is more than the axial length of the connecting sipe 22.

16 Claims, 6 Drawing Sheets

(56) References Cited

U.S. PATENT DOCUMENTS

| | | | | |
|---|---|---|---|---|
| 2012/0160385 A1* | 6/2012 | Tanaka | ................ | B60C 11/0306 |
| | | | | 152/209.22 |
| 2013/0092304 A1* | 4/2013 | Murata | ............... | B60C 11/0306 |
| | | | | 152/209.18 |
| 2014/0283967 A1* | 9/2014 | Inoue | ..................... | B60C 11/12 |
| | | | | 152/209.18 |
| 2014/0305559 A1* | 10/2014 | Takemoto | ........... | B60C 11/1236 |
| | | | | 152/209.8 |
| 2015/0151588 A1* | 6/2015 | Munezawa | ......... | B60C 11/1236 |
| | | | | 152/209.25 |
| 2018/0072105 A1* | 3/2018 | Wakasugi | ........... | B60C 11/0304 |
| 2018/0079261 A1* | 3/2018 | Kujime | ............... | B60C 11/0304 |
| 2019/0389255 A1* | 12/2019 | Kubota | .................. | B60C 11/03 |
| 2020/0001654 A1* | 1/2020 | Kubota | .............. | B60C 11/1204 |
| 2020/0001659 A1* | 1/2020 | Tanaka | ............... | B60C 11/1204 |

FOREIGN PATENT DOCUMENTS

| | | | |
|---|---|---|---|
| JP | 2012-218550 A | | 11/2012 |
| JP | 2014205459 A | * | 10/2014 |

OTHER PUBLICATIONS

Extended European Search Report, dated Jan. 24, 2018, for corresponding European Application No. 17187653.5.

\* cited by examiner

PNEUMATIC TIRE

TECHNICAL FIELD

The present invention relates to a pneumatic tire capable of exerting superior wet performance and steering stability.

BACKGROUND ART

Japanese Patent Application Publication No. 2012-218650 discloses a pneumatic tire, wherein the inboard shoulder portion of the tread is provided with shoulder lateral grooves each partially decreased in the width, and sipes alternated with the shoulder lateral grooves in order to improve the wet performance while maintaining the rigidity of the inboard shoulder portion. However, such tire has room for improvement in the wet performance and steering stability.

SUMMARY OF THE INVENTION

It is therefore, an object of the present invention to provide a pneumatic tire capable of exerting superior wet performance and steering stability.

According to the present invention, a pneumatic tire comprises:

a tread portion having an outboard tread edge to be positioned away from the center of a vehicle body and an inboard tread edge to be positioned close to the center of the vehicle body, the tread portion provided with main grooves extending continuously in the tire circumferential direction, and including an inboard shoulder main groove on the most inboard tread edge side, and an inboard shoulder land region defined between the inboard shoulder main groove and the inboard tread edge, the inboard shoulder land region provided with a plurality of inboard shoulder rug grooves extending axially inwardly from the inboard tread edge to have respective inner ends within the inboard shoulder land region, connecting sipes respectively extending from the inner ends of the inboard shoulder rug grooves to the inboard shoulder main groove, and a plurality of inboard shoulder sipes extending from the inboard tread edge to the inboard shoulder main groove, the inboard shoulder sipes including a bent inboard shoulder sipe, the bent inboard shoulder sipe comprising a straight outer part extending axially inwardly from the inboard tread edge, and a straight inner part extending to the inboard shoulder main groove at a flexion angle with respect to the outer part, wherein the axial length of the inner part is more than the axial length of the connecting sipe.

Further, the pneumatic tire according to the present invention may have the following features (1)-(7):
(1) the angles with respect to the tire axial direction of the connecting sipes are more than the angles with respect to the tire axial direction of the inboard shoulder rug grooves;
(2) the outer parts extend along the inboard shoulder rug grooves, and the inner parts extend along the connecting sipes;
(3) each of the connecting sipes comprises a radially outer wide part opened at the tread face, and a radially inner narrow part having a width less than the width at the opening of the wide part;
(4) an inboard middle land region of the tread portion adjacent to the inboard shoulder main groove on the outboard tread edge side is provided with a plurality of inboard middle sipes extending axially inwardly from the inboard shoulder main groove;
(5) the inboard middle sipes include first inboard middle sipes smoothly continued to the respective inboard shoulder sipes through the inboard shoulder main groove, and second inboard middle sipes smoothly continued to the respective connecting sipes through the inboard shoulder main groove;
(6) the first inboard middle sipes obliquely cross the inboard middle land region, and
the second inboard middle sipes curve within the inboard middle land region and respectively connect with the first inboard middle sipe;
(7) each of the first inboard middle sipes comprises a radially outer wide part opened at the tread face, and a radially inner narrow part having a width less than the width at the opening of the wide part.

In this application including specification and claims, various dimensions, positions and the like of the tire refer to those under a normally inflated unloaded condition of the tire unless otherwise noted.

The tread edges Te1 and Te2 are the axial outermost edges of the ground contacting patch of the tire which occurs under a normally inflated loaded condition when the camber angle of the tire is zero.

The tread width TW is the width measured under the normally inflated unloaded condition, as the axial distance between the tread edges Te determined as above.

The normally inflated unloaded condition is such that the tire is mounted on a standard wheel rim and inflate to a standard pressure but loaded with no tire load.

The normally inflated loaded condition is such that the tire is mounted on the standard wheel rim and inflated to the standard pressure and loaded with a standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

The term "sipe" means a narrow groove having a width less than 2.0 mm inclusive of a cut having no substantial width.

DESCRIPTION OF THE PREFERRED EMBODIMENTS

The present invention can be applied to various tires and suitably applied to a pneumatic tire for passenger cars.

Taking a pneumatic tire for passenger cars as an example, embodiments of the present invention will now be described in detail in conjunction with the accompanying drawings.

Figure 1:
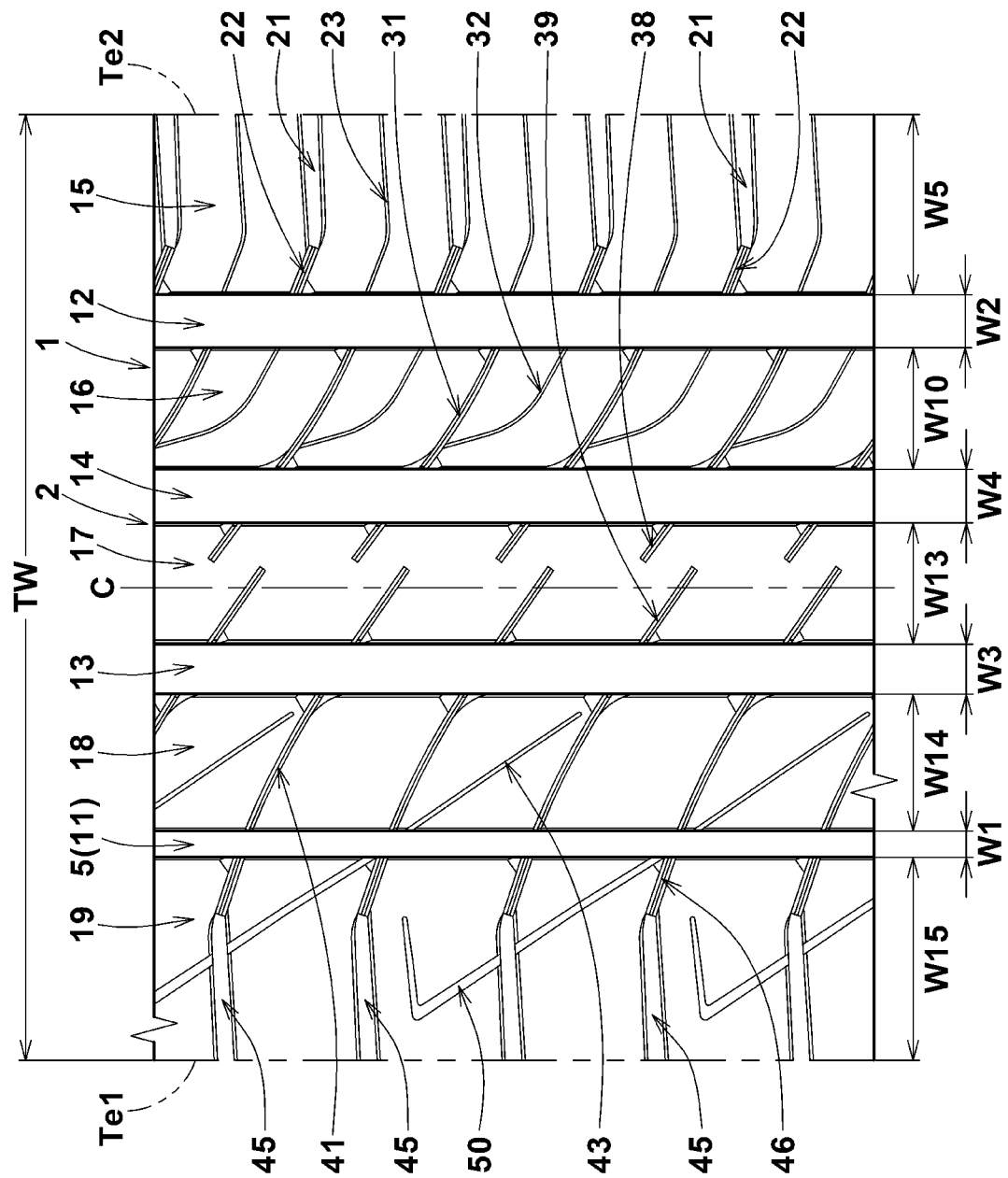
FIG. 1 is a developed partial plan view of a tire as an embodiment of the present invention showing a tread portion.

FIG. 1 shows a pneumatic tire 1 as an embodiment of the present invention.

As well known in the art, a pneumatic tire comprises a tread portion 2 whose radially outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion.

The tread portion 2 is provided with an asymmetrical tread pattern, and the mounting position of the tire, namely, which side of the tire is outside, is specified by an indication such as characters and marking provided on the tire sidewall portion (not shown).

Thus, the tread portion 2 has an outboard tread edge Te1 to be positioned away from the center of a vehicle body, and an inboard tread edge Te2 to be positioned close to the center of the vehicle body.

The tread portion 2 is provided with a plurality of main grooves extending continuously in the tire circumferential direction 5.

In the present embodiment, each of the main grooves 5 extends straight in parallel with the tire circumferential direction. However, all or some of the main grooves 5 may be a zigzag or wavy groove.

In the present embodiment, the main grooves 5 are an outboard shoulder main groove 11 on the most outboard tread edge Te1 side, an inboard shoulder main groove 12 on the most inboard tread edge Te2 side, an outboard crown main groove 13 between the outboard shoulder main groove 11 and the tire equator C, and an inboard crown main groove 14 between the inboard shoulder main groove 12 and the tire equator C.

It is preferable that the axial distance from the tire equator C to the groove center line of the outboard shoulder main groove 11 is 0.20 to 0.35 times the tread width TW, the axial distance from the tire equator C to the groove center line of the inboard shoulder main groove 12 is 0.20 to 0.35 times the tread width TW, the axial distance from the tire equator C to the groove center line of the outboard crown main groove 13 is 0.05 to 0.15 times the tread width TW, and the axial distance from the tire equator C to the groove center line of the inboard crown main groove 14 is 0.05 to 0.15 times the tread width TW.

In order to improve the wet performance and steering stability in good balance, it is preferred that the groove width w2 of the inboard shoulder main groove 12 is 3% to 7% of the tread width TW, the groove width w3 of the outboard crown main groove 13 is 3% to 7% of the tread width TW, the groove width w4 of the inboard crown main groove 14 is 3% to 7% of the tread width TW, and the groove width w1 of the outboard shoulder main groove 11 is smallest in the main grooves 5. More specifically, the groove width w1 of the outboard shoulder main groove 11 is preferably 2% to 4% of the tread width TW.

In the case of a passenger car tire, it is preferable that the depth of each of the main grooves 5 is 5 to 10 mm.

By the main grooves 11-14, the tread portion 2 is provided with at least an inboard shoulder land region 15 defined between the inboard tread edge Te2 and the inboard shoulder main groove 12.

Figure 2:
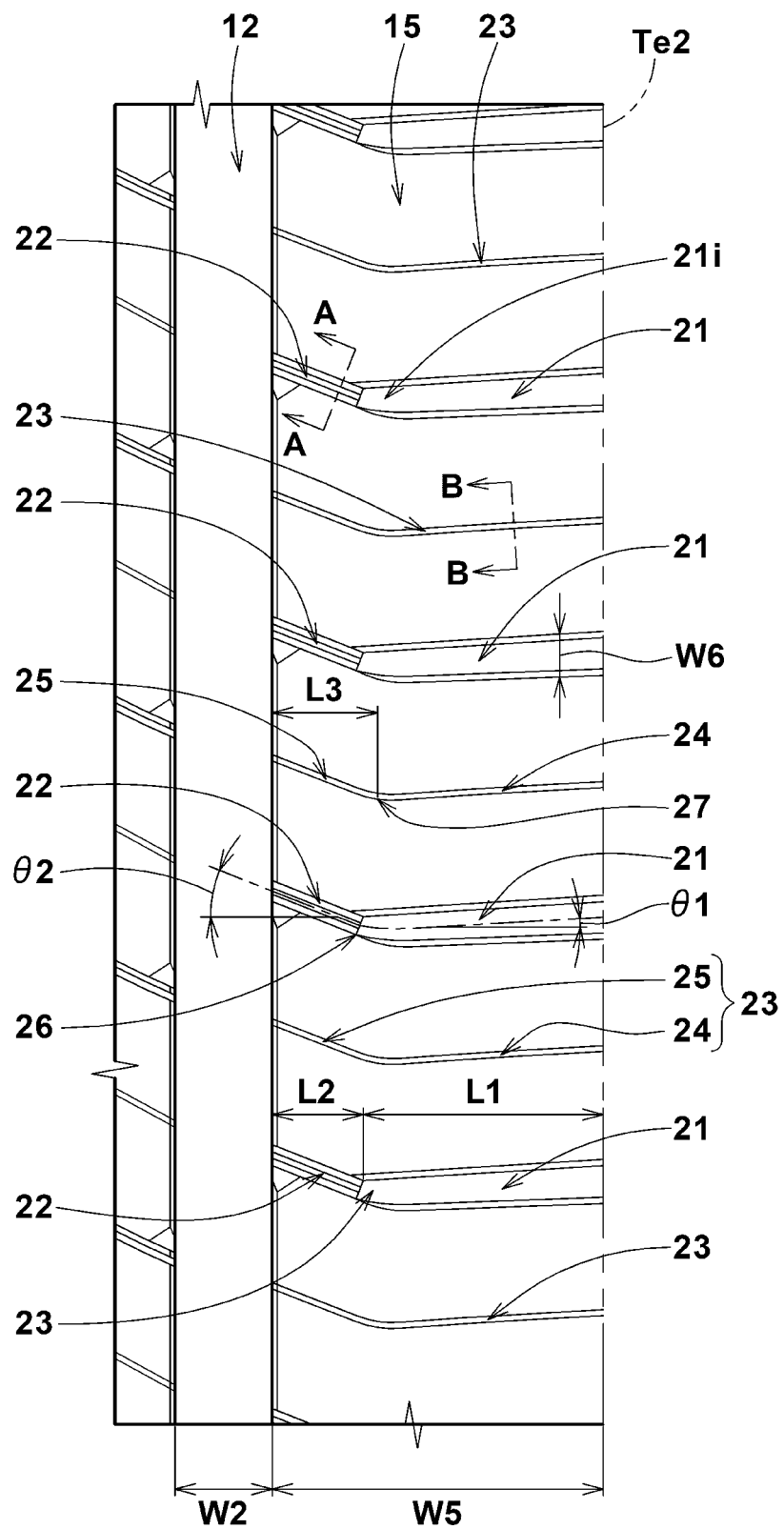
FIG. 2 is a partial plan view of the inboard shoulder land region shown in FIG. 1.

As shown in FIG. 2, the inboard shoulder land region 15 is provided with a plurality of inboard shoulder rug grooves 21.

The inboard shoulder rug grooves 21 extend axially inwardly from the inboard tread edge Te2 and terminate within the inboard shoulder land region 15 so as to have inner ends 21i within the inboard shoulder land region 15. Thereby, the rigidity of the inboard shoulder land region 15 is maintained in its axially inner part while providing superior drainage.

In order to improve the wet performance and steering stability in good balance, it is preferred that the axial length L1 of the inboard shoulder rug grooves 21 is 0.70 to 0.85 times the axial width w5 of the inboard shoulder land region 15, and the groove width w6 of the inboard shoulder rug grooves 21 is 0.30 to 0.40 times the groove width w2 of the inboard shoulder main groove 12.

In the present embodiment, the inboard shoulder rug grooves 21 are slightly inclined with respect to the tire axial direction. Preferably, the angle θ1 of the inboard shoulder rug grooves 21 is not more than 5 degrees with respect to the tire axial direction.

such inboard shoulder rug grooves 21 can provide friction in the tire circumferential direction by their edges during wet running, and can lead water existing in the grooves toward the inboard tread edge Te2.

Further, the inboard shoulder land region 15 is provided with a plurality of inboard connecting sipes 22 and a plurality of inboard shoulder sipes 23.

The inboard connecting sipes 22 extend from the respective inner ends 21i of the inboard shoulder rug grooves 21 to the inboard shoulder main groove 12.

In this example, the axial lengths L2 of the inboard connecting sipes 22 are 0.15 to 0.35 times the axial width w5 of the inboard shoulder land region 15.

Preferably, the inboard connecting sipes 22 are inclined to the opposite direction to the inboard shoulder rug grooves 21. Preferably, the angle θ2 with respect to the tire axial direction of the inboard connecting sipes 22 is more than the angle θ1 with respect to the tire axial direction of the inboard shoulder rug grooves 21. For example, the angle θ2 is set in a range from 20 to 30 degrees.

The inboard shoulder sipes 23 extend from the inboard tread edge Te2 to the inboard shoulder main groove 12.

The inboard shoulder sipes 23 and the connecting sipes 22 improve wet grip performance by their edges.

Further, in the ground contacting patch of the tire, the opposite side walls of the sipe can contact and support each other to maintain the rigidity of the land region and thereby the wet performance and steering stability can be improved in good balance.

The inboard shoulder sipes 23 include a bent inboard shoulder sipe 23. In the present embodiment, all of the inboard shoulder sipes 23 are a bent inboard shoulder sipe 23.

The bent inboard shoulder sipe 23 is made up of a straight outer part 24 extending from the inboard tread edge Te2 toward the axially inside, and
a straight inner part 25 extending to the inboard shoulder main groove 12 at a flexion angle with respect to the outer part 24. such bent inboard shoulder sipe 23 can prevent shearing deformation in the tire axial direction of the land region when the opposite side walls of the sipe contact with each other. In order to ensure the above-mentioned effect, the axial length L3 of the inner part 25 is set to be more than the axial length L2 of the connecting sipe 22.

By setting the lengths L3 and L2 in this way, the junction 27 of the outer part 24 and the inner part 25 is shifted in the tire axial direction from the junction 26 of the connecting sipe 22 and the inboard shoulder rug groove 21. If the junctions 26 and the junctions 27 are positioned at the same axial position, deformation of the land region tends to concentrate at that position. However, as the junctions 26 and 27 are shifted, the deformation is dispersed. Consequently, superior steering stability can be obtained.
Further, as the length of the connecting sipe 22 becomes relatively short, the distance from the inner ends of the inboard shoulder rug grooves 21 to the inboard shoulder main groove 12 becomes small, and superior wet performance can be obtained.
on the other hand, rigidity around the junction 27 is higher than rigidity around the junction 26, and the junctions 27 are disposed closer to the inboard tread edge Te2. Thereby, the steering stability can be improved.

In order to effectively derive the above described advantageous effects, the axial length L3 of the inner part 25 is preferably not less than 1.15 times, more preferably not less than 1.20 times, but preferably not more than 1.30 times, more preferably not more than 1.25 times the length L2 of the connecting sipe 22.

Further, the inner parts 25 are preferably inclined to the same direction as the inboard connecting sipes 22, more preferably, substantially parallel with the inboard connecting sipes 22 to prevent uneven wear of the land region.
For the same reason, the outer parts 24 are preferably inclined to the same direction as the inboard shoulder rug grooves 21, more preferably, substantially parallel with the inboard shoulder rug grooves 21.

Figure 3A:
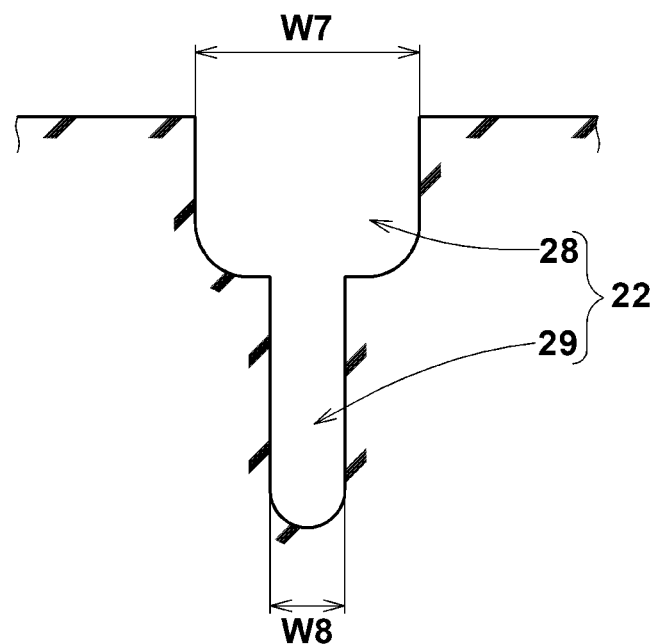
FIG. 3(a) is a cross sectional view taken along line A-A of FIG. 2.

In order to improve the wet performance, it is preferable that, as shown in FIG. 3(a), the connecting sipe 22 comprises a radially outer wide part 28 opened at the tread portion 2, and a radially inner narrow part 29 having a width less than the width of the wide part 28 at the opening.

In the cross section perpendicular to the longitudinal direction of the connecting sipe 22, the width w7 of the wide part 28 at the opening is less than 2 mm, preferably between 1.5 to 1.8 mm, and the width w8 of the narrow part 29 is preferably set in a range from 0.5 to 1.0 mm in order to improve the wet performance while maintaining the rigidity of the land region.

Figure 3B:
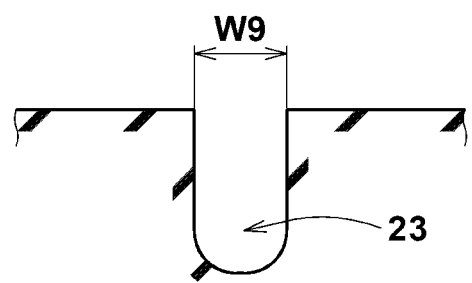
FIG. 3(b) is a cross sectional view taken along line B-B of FIG. 2.

On the other hand, as shown in FIG. 3(b), the inboard shoulder sipe 23 extends in the tire radial direction at a constant width w9. The width w9 is preferably set in a range from 1.0 to 1.5 mm.

As shown in FIG. 1, the tread portion 2 in the present embodiment is further provided with
an inboard middle land region 16 defined between the inboard shoulder main groove 12 and the inboard crown main groove 14,
a crown land region 17 defined between the inboard crown main groove 14 and the outboard crown main groove 13,
an outboard middle land region 18 defined between the outboard crown main groove 13 and the outboard shoulder main groove 11, and
an outboard shoulder land region 19 defined between the outboard shoulder main groove 11 and the outboard tread edge Te1.

Figure 4:
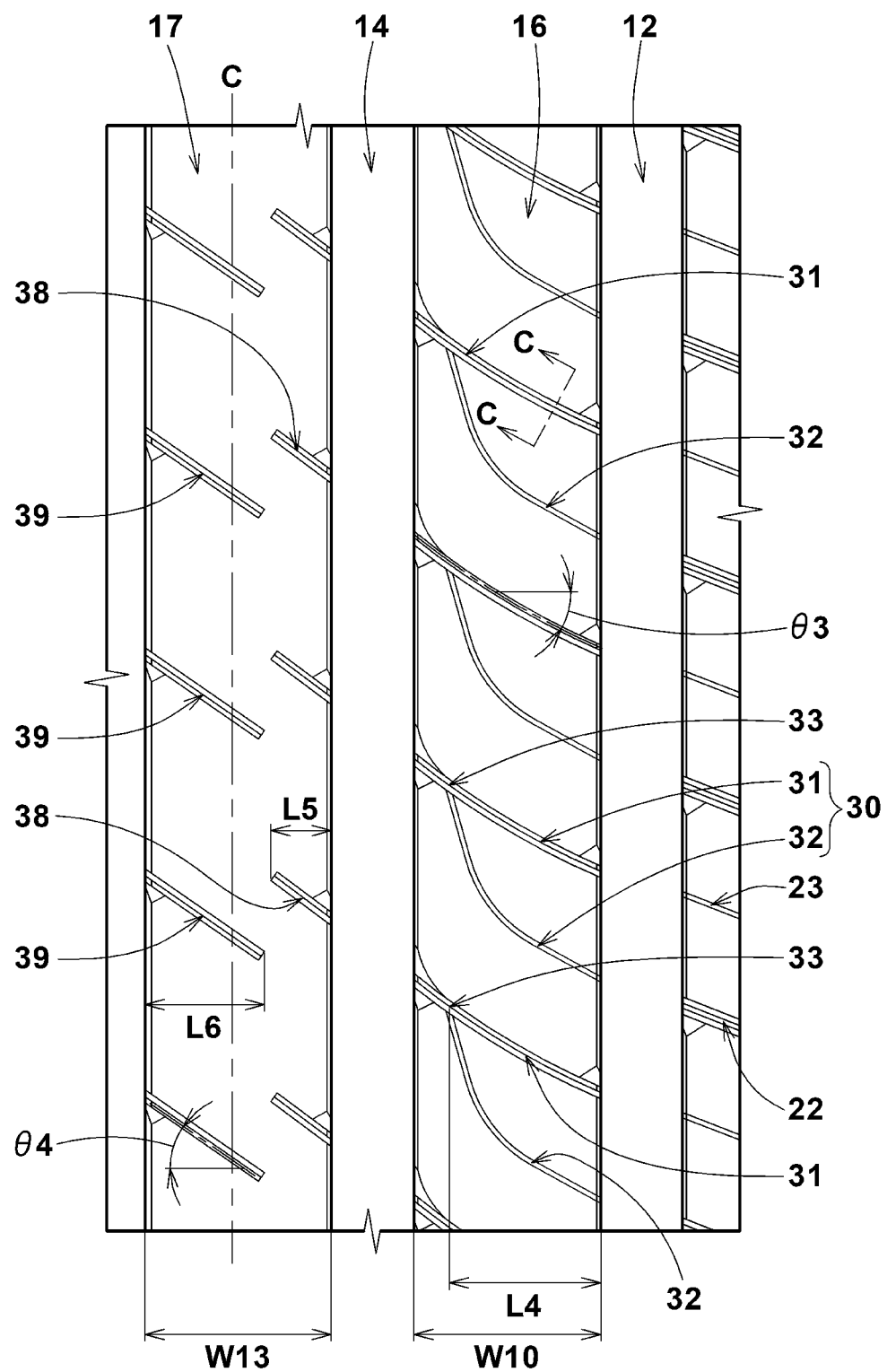
FIG. 4 is a partial plan view of the inboard middle land region and a crown land region shown in FIG. 1.

As shown in FIG. 4, the inboard middle land region 16 is provided with a plurality of inboard middle sipes 30 extending axially inwardly from the inboard shoulder main groove 12.

In the present embodiment, the inboard middle sipes 30 include first inboard middle sipes 31 and second inboard middle sipes 32.

The first inboard middle sipes 31 extend obliquely across the entire width of the inboard middle land region 16.

Preferably, the angles θ3 of the first inboard middle sipes 31 are set in a range from 25 to 45 degrees with respect to the tire axial direction so as to provide friction in the tire axial direction and thereby to improve wet cornering performance.

The second inboard middle sipes 32 are curved and connected to the respective first inboard middle sipes 31 within the inboard middle land region 16 in order to maintain the rigidity of an axially inner part of the inboard middle land region 16 while exerting edge effect.

The first inboard middle sipes 31 are smoothly continued to the respective inboard shoulder sipes 23 through the inboard shoulder main groove 12, and
the second inboard middle sipes 32 are smoothly continued to the respective inboard connecting sipes 22 through the inboard shoulder main groove 12 in order to cooperate with the inboard shoulder sipes 23 and the connecting sipes 22 to improve the wet performance.

In this specification, the expression "a sipe x is smoothly continued to a sipe Y through a main groove z" means that an extension of the sipe x extended in a tangential direction to the sipe x at the intersection with the main groove z overlaps with the sipe Y at the intersection with the main groove z.

It is preferable that the junctions 33 of the second inboard middle sipes 32 with the first inboard middle sipes 31 are positioned axially inside the center in the tire axial direction of the inboard middle land region 16.
Preferably, the axial distance L4 of the junction 33 from the axially outer edge of the inboard middle land region 16 is set in a range from 0.70 to 0.80 times the axial width w10 of the inboard middle land region 16.
such arrangement serves to improve the wet performance and steering stability in good balance.

Figure 5:
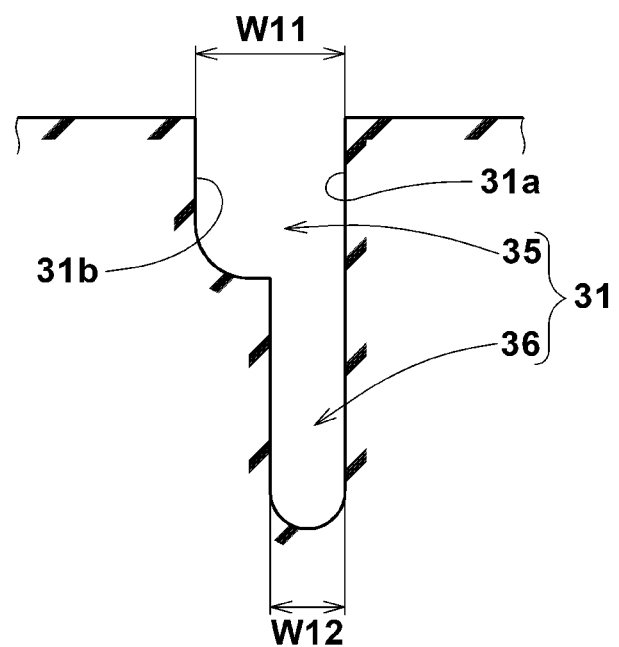
FIG. 5 is a cross sectional view taken along line C-C of FIG. 4.

It is preferable that, as shown in FIG. 5, the first inboard middle sipe 31 comprises a radially outer wide part 35 opened at the tread portion 2, and a radially inner narrow part 36 having a width less than the width w11 of the wide part 35 at the opening.

In the cross section perpendicular to the longitudinal direction of the first inboard middle sipe 31, it is preferable that the width w11 is set in a range from 1.5 to 1.8 mm, and the width W12 of the narrow part 36 is set in a range from 0.5 to 1.0 mm.

The first inboard middle sipe 31 has first and second opposite side walls 31a and 31b, wherein
the first side wall 31a extends straight from the tread face to the rounded bottom of the sipe 31, and
the second side wall 31b extends stepwise from the tread face to the bottom of the sipe 31 so that the width of the sipe 31 varies as described above.
The edge of the first side wall 31a of the first inboard middle sipe 31 generates a larger frictional force, therefore, the first inboard middle sipe 31 can increase grip performance during either accelerating or decelerating.

The second inboard middle sipe 32 has first and second opposite sipe side walls having the same structure as the inboard shoulder sipe 23 to have a cross-sectional shape as shown in FIG. 3(b).

The crown land region 17 is provided with inboard crown sipes 38 extending from the inboard crown main groove 14 toward the outboard crown main groove 13, and outboard crown sipes 39 extending from the outboard crown main groove 13 toward the inboard crown main groove 14 as shown in FIG. 4.

The inboard and outboard crown sipes 38 and 39 are inclined to the same direction as the inboard middle sipes 30. The angles θ4 of the crown sipes 38 and 39 are preferably set in a range from 30 to 40 degrees with respect to the tire axial direction.

In the present embodiment, the inboard crown sipe 38 terminates within the crown land region 17 without crossing the tire equator C.
Preferably, the axial length L5 of the inboard crown sipe 38 is set in a range from 0.25 to 0.35 times the axial width W13 of the crown land region 17.

It is preferable that the inboard crown sipes 38 are smoothly continued to the respective first inboard middle sipes 31 through the inboard crown main groove 14.
such inboard crown sipes 38 serve to even the progresses of wear of the land regions.

In the present embodiment, the outboard crown sipe 39 extends beyond the tire equator C and terminates within the crown land region 17.
Preferably, the axial length L6 of the outboard crown sipe 39 is set in a range from 0.60 to 0.70 times the axial width w13 of the crown land region 17.

Figure 6:
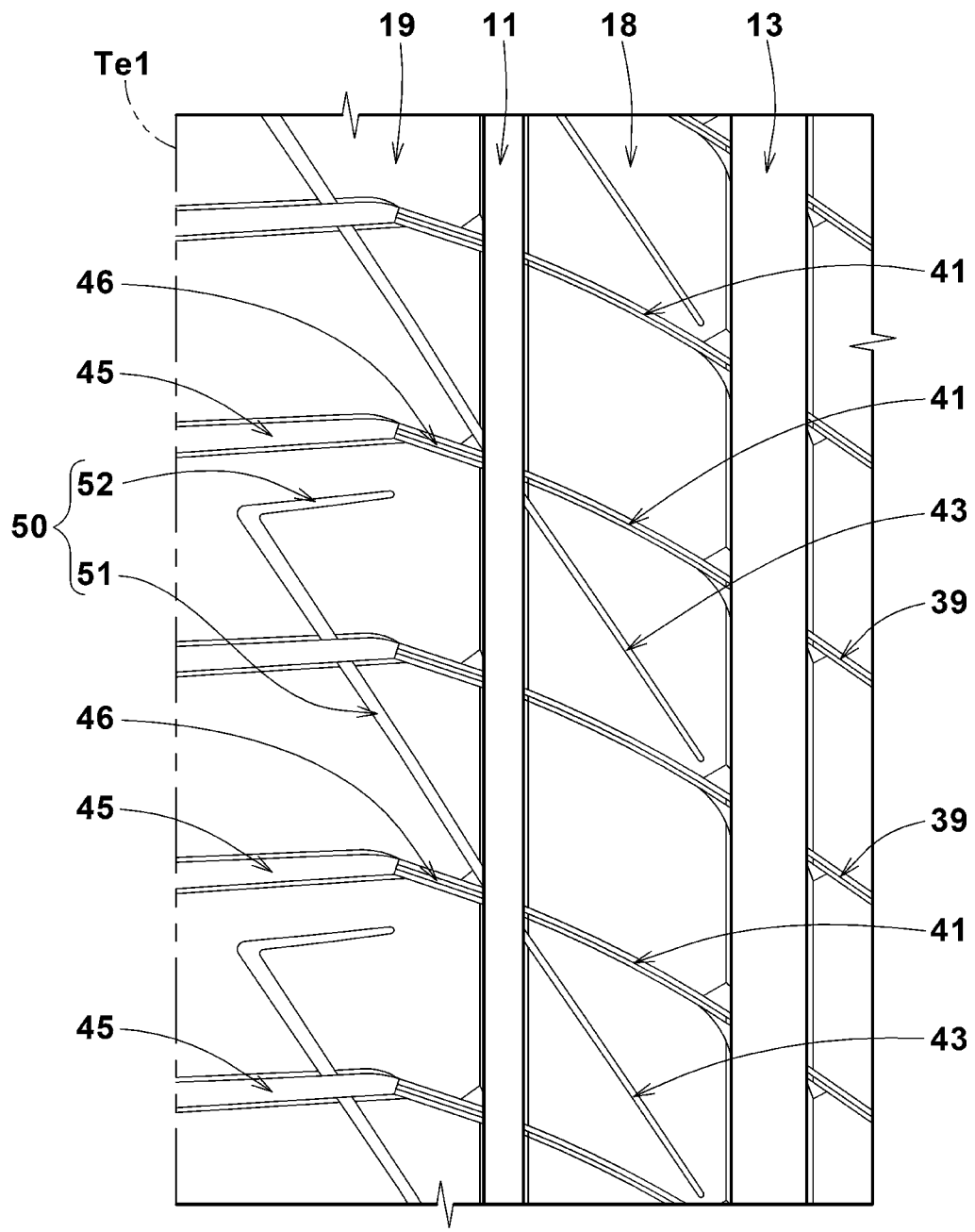
FIG. 6 is a partial plan view of an outboard middle land region and an outboard shoulder land region shown in FIG. 1.

As shown in FIG. 6, the outboard middle land region 18 is provided with a plurality of outboard middle sipes 41 extending across the entire width of the land region 18.

The outboard middle sipe 41 has first and second opposite side walls having the same structure as the first inboard middle sipe 31 to have a cross-sectional shape as shown in FIG. 3(a).
In the present embodiment, the outboard middle sipes 41 are smoothly continued to the respective outboard crown sipes 39 through the outboard crown main groove 13.

The sections of the outboard middle land region 18 deliminated by the outboard middle sipes 41 are each provided with a oblique sipe 43 extending along a diagonal line of the section. Such oblique sipe 43 can provide friction in the tire axial direction by the edges.

The outboard shoulder land region 19 is provided with outboard shoulder rug grooves 45 and outboard connecting sipes 46.

The outboard shoulder rug groove 45 has the same structure as the inboard shoulder rug groove 21.
The outboard connecting sipe 46 has the same structure as the inboard connecting sipe 22.
It is preferable that the outboard connecting sipes 46 provided in the outboard shoulder land region 19 are smoothly continued to the outboard middle sipes 41 through the outboard shoulder main groove 11.

It is preferable that the outboard shoulder land region 19 is provided with shallow grooves 50 smoothly continued to the oblique sipes 43 disposed in the outboard middle land region 18 through the outboard shoulder main groove 11.

The shallow groove 50 in this example comprises a first part 51 extending across one of the outboard shoulder rug grooves 45 obliquely, and a second part 52 extending axially inwardly from the axially outer end of the first part 51.
The second part 52 reaches to the outboard shoulder main groove 11, but the first part 51 terminates without reaching thereto. The shallow groove 50 has a L-shaped configuration or check-mark-like configuration. Such shallow grooves 50 serve to improve wet cornering performance.

In this embodiment, in order to improve the wet performance and steering stability in good balance, the land regions are, as shown in FIG. 1, provided with different axial widths as follows.
Preferably, the axial width w5 of the inboard shoulder land region 15 is set in a range from 1.40 to 1.60 times the axial width W13 of the crown land region 17.
Preferably, the axial width w10 of the inboard middle land region 16 is set in a range from 0.95 to 1.15 times the axial width w13 of the crown land region 17.
Preferably, the axial width w14 of the outboard middle land region 18 is set in a range from 1.05 to 1.25 times the axial width w13 of the crown land region 17.
Preferably, the axial width w15 of the outboard shoulder land region 19 is set in a range from 1.55 to 1.75 times the axial width w13 of the crown land region 17.

It is preferable that the land ratio La2 of the inboard half tread portion between the tire equator C and the inboard tread edge Te2 is more than the land ratio La1 of the outboard half tread portion between the tire equator C and the outboard tread edge Te1. For example, the land ratio La1 is set in a range from 60% to 70%, and the land ratio La2 is set in a range from 65% to 75%.
Here, the land ratio is a ratio of the total ground contacting area to the overall area of the concerned portion.

While detailed description has been made of an especially preferable embodiment of the present invention, the present invention can be embodied in various forms without being limited to the illustrated embodiment.

Comparison Tests

Based on the tread pattern shown in FIG. 1, test tires of size 215/60R16 (rim: 16×7.0J) where experimentally manufactured and tested for the steering stability and wet performance. The test tires including working examples Ex. 1-Ex. 9 and comparative example Ref. had the same specifications except for those shown in Table 1.

<Steering Stability Test>
using a test car (2500 cc rear-drive passenger car) provided on all wheels with test tires inflated to 250 kPa, a test driver evaluated the steering stability during running on a dry road. The results are indicated in Table 1 by an index based on comparative example being 100, wherein the larger the value, the better the steering stability.

<Wet Performance Test>
The test car was run along a 100 meter radius circle on an asphalt road partially provided with a 5 mm depth 20 m long water pool, and the lateral acceleration (lateral G) during running in the water pool was measured at the front wheels, gradually increasing the speed entering into the water pool, to obtain the average for the speed range of from 50 to 80 km/h. The results are indicated in Table 1 by an index based on comparative example being 100, wherein the larger the value, the better the wet performance.

TABLE 1

| Tire | Ref. | Ex.1 | Ex.2 | Ex.3 | Ex.4 | Ex.5 | Ex.6 | Ex.7 | Ex.8 | Ex.9 |
|---|---|---|---|---|---|---|---|---|---|---|
| Connecting sipe length L2/ Inboard shoulder land region width W5 | 0.25 | 0.25 | 0.25 | 0.25 | 0.25 | 0.25 | 0.15 | 0.20 | 0.30 | 0.35 |
| Inner part length L3/ Connecting sipe length L2 | 0.90 | 1.23 | 1.15 | 1.20 | 1.25 | 1.30 | 1.23 | 1.23 | 1.23 | 1.23 |
| Steering stability | 100 | 106 | 104 | 106 | 107 | 107 | 103 | 104 | 108 | 110 |
| Wet performance | 100 | 103 | 101 | 102 | 102 | 101 | 105 | 104 | 101 | 100 |

From the test results, it was confirmed that tires according to the present invention can exert superior wet performance and steering stability.

REFERENCE SIGNS LIST 2 tread portion
12 inboard shoulder main groove
15 inboard shoulder land region
21 inboard shoulder rug grooves
22 connecting sipe
23 inboard shoulder sipe
24 outer part
25 inner part
Te1 outboard tread edge
Te2 inboard tread edge

The invention claimed is:

1. A pneumatic tire comprising:
a tread portion having an outboard tread edge to be positioned away from the center of a vehicle body and an inboard tread edge to be positioned close to the center of the vehicle body, the tread portion being provided with
main grooves extending continuously in the tire circumferential direction, and including an inboard shoulder main groove on the most inboard tread edge side, and
an inboard shoulder land region defined between the inboard shoulder main groove and the inboard tread edge,
wherein
the inboard shoulder land region is provided with
a plurality of inboard shoulder lug grooves extending axially inwardly from the inboard tread edge to have respective inner ends within the inboard shoulder land region,
connecting sipes respectively extending from the inner ends of the inboard shoulder lug grooves to the inboard shoulder main groove, and
a plurality of inboard shoulder sipes extending from the inboard tread edge to the inboard shoulder main groove,
the inboard shoulder sipes include a bent inboard shoulder sipe,
the bent inboard shoulder sipe comprises a straight outer part extending axially inwardly from the inboard tread edge, and a straight inner part extending to the inboard shoulder main groove at a flexion angle with respect to the outer part,
the axial length of the inner part is more than the axial length of the connecting sipe,
an inboard middle land region of the tread portion adjacent to the inboard shoulder main groove on the outboard tread edge side is provided with a plurality of inboard middle sipes extending axially inwardly from the inboard shoulder main groove,
the inboard middle sipes include
first inboard middle sipes that smoothly continue to the respective inboard shoulder sipes through the inboard shoulder main groove such that an extension of each first inboard middle sipe extended in a tangential direction to each first inboard middle sipe at its intersection with the inboard shoulder main groove overlaps with one of the inboard shoulder sipes at its intersection with the inboard shoulder main groove, and that each incline with respect to the tire axial direction in the same direction as one of the inboard shoulder sipes, and
second inboard middle sipes
that smoothly continue to the respective connecting sipes through the inboard shoulder main groove such that an extension of each second inboard middle sipe extended in a tangential direction to each second inboard middle sipe at its intersection with the inboard shoulder main groove overlaps with one of the connecting sipes at its intersection with the inboard shoulder main groove, and that each incline with respect to the tire axial direction in the same direction as the one of the connecting sipes,
wherein
each of the connecting sipes comprises a radially outer wide part opened at the tread face and extending radially inwardly from the opening while maintaining a constant width, and
a radially inner narrow part extending radially inwardly from its radially outer end while having a constant width less than said constant width at the opening of the wide part.

2. A pneumatic tire comprising:
a tread portion having an outboard tread edge to be positioned away from the center of a vehicle body and an inboard tread edge to be positioned close to the center of the vehicle body, the tread portion provided with
main grooves extending continuously in the tire circumferential direction, and including an inboard shoulder main groove on the most inboard tread edge side, and
an inboard shoulder land region defined between the inboard shoulder main groove and the inboard tread edge, wherein
the inboard shoulder land region is provided with
a plurality of inboard shoulder lug grooves extending axially inwardly from the inboard tread edge to have respective inner ends within the inboard shoulder land region,
connecting sipes respectively extending from the inner ends of the inboard shoulder lug grooves to the inboard shoulder main groove, and
a plurality of inboard shoulder sipes extending from the inboard tread edge to the inboard shoulder main groove,
the inboard shoulder sipes include a bent inboard shoulder sipe,
the bent inboard shoulder sipe comprises a straight outer part extending axially inwardly from the inboard tread edge, and a straight inner part extending to the inboard shoulder main groove at a flexion angle with respect to the outer part,
the axial length of the inner part is more than the axial length of the connecting sipe,
an inboard middle land region of the tread portion adjacent to the inboard shoulder main groove on the outboard tread edge side is provided with a plurality of inboard middle sipes extending axially inwardly from the inboard shoulder main groove,
the inboard middle sipes include
first inboard middle sipes that smoothly continue to the respective inboard shoulder sipes through the inboard shoulder main groove such that an extension of each first inboard middle sipe extended in a tangential direction to each first inboard middle sipe at its intersection with the inboard shoulder main groove overlaps with one of the inboard shoulder sipes at its intersection with the inboard shoulder main groove, and that each incline with respect to the tire axial direction in the same direction as one of the inboard shoulder sipes, and
second inboard middle sipes that smoothly continue to the respective connecting sipes through the inboard shoulder main groove such that an extension of each second inboard middle sipe extended in a tangential direction to each second inboard middle sipe at its intersection with the inboard shoulder main groove overlaps with one of the connecting sipes at its intersection with the inboard shoulder main groove, and that each incline with respect to the tire axial direction in the same direction as the one of the connecting sipes,
wherein the first inboard middle sipes obliquely cross the inboard middle land region, and the second inboard middle sipes bend within the inboard middle and region and respectively intersect with the first inboard middle sipes.

3. A pneumatic tire comprising:
a tread portion having an outboard tread edge to be positioned away from the center of a vehicle body and an inboard tread edge to be positioned close to the center of the vehicle body, the tread portion provided with
main grooves extending continuously in the tire circumferential direction, and including an inboard shoulder main groove on the most inboard tread edge side, and
an inboard shoulder land region defined between the inboard shoulder main groove and the inboard tread edge,
wherein
the inboard shoulder land region is provided with
a plurality of inboard shoulder lug grooves extending axially inwardly from the inboard tread edge to have respective inner ends within the inboard shoulder land region,
connecting sipes respectively extending from the inner ends of the inboard shoulder lug grooves to the inboard shoulder main groove, and
a plurality of inboard shoulder sipes extending from the inboard tread edge to the inboard shoulder main groove,
the inboard shoulder sipes include a bent inboard shoulder sipe,
the bent inboard shoulder sipe comprises a straight outer part extending axially inwardly from the inboard tread edge, and a straight inner part extending to the inboard shoulder main groove at a flexion angle with respect to the outer part,
the axial length of the inner part is more than the axial length of the connecting sipe,
an inboard middle land region of the tread portion adjacent to the inboard shoulder main groove on the outboard tread edge side is provided with a plurality of inboard middle sipes extending axially inwardly from the inboard shoulder main groove,
the inboard middle sipes include
first inboard middle sipes that smoothly continue to the respective inboard shoulder sipes through the inboard shoulder main groove such that an extension of each first inboard middle sipe extended in a tangential direction to each first inboard middle sipe at its intersection with the inboard shoulder main groove overlaps with one of the inboard shoulder sipes at its intersection with the inboard shoulder main groove, and that each incline with respect to the tire axial direction in the same direction as one of the inboard shoulder sipes, and
second inboard middle sipes that smoothly continue to the respective connecting sipes through the inboard shoulder main groove such that an extension of each second inboard middle sipe extended in a tangential direction to each second inboard middle sipe at its intersection with the inboard shoulder main groove overlaps with one of the connecting sipes at its intersection with the inboard shoulder main groove, and that each incline with respect to the tire axial direction in the same direction as the one of the connecting sipes,
wherein
said main grooves include an outboard shoulder main groove on the most outboard tread edge side,
the tread portion is provided with an outboard middle land region adjacent to the outboard shoulder main groove on the inboard tread edge side,
the outboard middle land region is provided with
a plurality of outboard middle sipes extending across the entire width of the outboard middle land region, and
a plurality of oblique sipes extending axially inwardly from the outboard shoulder main groove and terminating within the outboard middle land region, without being connected with the outboard middle sipes.

4. The pneumatic tire according to claim 3, wherein the angles with respect to the tire axial direction of the connecting sipes are more than the angles with respect to the tire axial direction of the inboard shoulder lug grooves.

5. The pneumatic tire according to claim 3, wherein
the outer parts extend along the inboard shoulder lug grooves, and
the inner parts extend along the connecting sipes.

6. The pneumatic tire according to claim 3, wherein each of the first inboard middle sipes comprises
a radially outer wide part opened at the tread face and extending radially inwardly from the opening while keeping a constant width, and
a radially inner narrow part extending radially inwardly from its radially outer end while having a constant width less than said constant width at the opening of the wide part.

7. The pneumatic tire according to claim 3, wherein all the sipes provided in the inboard middle land region are said first inboard middle sipes and said second inboard middle sipes.

8. The pneumatic tire according to claim 3, wherein sipes provided in the outboard middle land region are said outboard middle sipes and said oblique sipes.

9. The pneumatic tire according to claim 8, wherein
the tread portion is provided with an outboard shoulder land region defined between the outboard shoulder main groove and the outboard tread edge, and
the outboard shoulder land region is provided with
a plurality of outboard shoulder lug grooves extending axially inwardly from the outboard tread edge to have respective inner ends within the outboard shoulder land region, and
connecting sipes respectively extending from the inner ends of the outboard shoulder lug grooves to the outboard shoulder main groove, wherein each of the connecting sipes comprises a radially outer wide part opened at the tread face and extending radially inwardly from the opening while keeping a constant width, and a radially inner narrow part extending radially inwardly from its radially outer end while having a constant width less than said constant width at the opening of the wide part.

10. The pneumatic tire according to claim 9, wherein
the outboard shoulder land region is provided with shallow grooves each comprising a first part extending across one of the outboard shoulder lug grooves obliquely and reaching to the outboard shoulder main groove, and
a second part extending axially inwardly from the axially outer end of the first part and terminating without reaching to the outboard shoulder main groove so that the shallow groove has a L-shaped configuration.

11. The pneumatic tire according to claim 10, wherein the first parts of the shallow grooves are smoothly continued to the respective oblique sipes disposed in the outboard middle land region through the outboard shoulder main groove.

12. The pneumatic tire according to claim 11, wherein
said main grooves include an inboard crown main groove disposed between the tire equator and the inboard shoulder main groove, and an outboard crown main groove disposed between the tire equator and the outboard shoulder main groove,
the tread portion is provided with a crown land region defined between the inboard crown main groove and the outboard crown main groove,
the crown land region is provided with
inboard crown sipes extending from the inboard crown main groove toward the outboard crown main groove, and
outboard crown sipes extending from the outboard crown main groove toward the inboard crown main groove, and
the inboard and outboard crown sipes are inclined to the same direction as the inboard middle sipes.

13. The pneumatic tire according to claim 12, wherein
the inboard crown sipes terminate within the crown land region without crossing the tire equator, and
the outboard crown sipes extend beyond the tire equator and terminate within the crown land region.

14. The pneumatic tire according to claim 13, wherein the inboard crown sipes are smoothly continued to the respective first inboard middle sipes through the inboard crown main groove.

15. The pneumatic tire according to claim 14, wherein the outboard crown sipes are smoothly continued to the respective outboard middle sipes through the outboard crown main groove.

16. The pneumatic tire according to claim 15, wherein sipes provided in the crown land region are said inboard crown sipe and said outboard crown sipe.

* * * * *